(12) United States Patent
Barral

(10) Patent No.: US 6,526,373 B1
(45) Date of Patent: Feb. 25, 2003

(54) OPTIMIZATION TOOL FOR ROBOT PLACEMENT

(75) Inventor: David Barral, Reuil Malmaison (FR)

(73) Assignee: Dassault Systemes, Suresnes (FR)

( * ) Notice: Subject to any disclaimer, the term of this patent is extended or adjusted under 35 U.S.C. 154(b) by 0 days.

(21) Appl. No.: 09/414,618

(22) Filed: Oct. 8, 1999

(51) Int. Cl.$^7$ .............................. G06F 17/10; G06G 7/48
(52) U.S. Cl. .................. 703/6; 703/2; 703/7; 700/245; 901/1
(58) Field of Search .......................... 901/42, 1; 703/1, 703/2, 6, 7; 701/23; 700/245; 382/173

(56) References Cited

U.S. PATENT DOCUMENTS

| | | | |
|---|---|---|---|
| 5,155,423 A | * 10/1992 | Karlen | 318/568 |
| 5,748,847 A | * 5/1998 | Lo | 395/23 |
| 6,031,935 A | * 2/2000 | Kimmel | 382/173 |

OTHER PUBLICATIONS

M.L. Tay et al., "Optimizing Robot Workcell Layout", *Advanced Manufacturing Technology*, 1996, pp. 377–385.
V. Scheinman et al., "On the Optimal Selection and Placement of Manipulators", *Theory and Practice of Robots and Manipulators*, 1985, pp. 39–45.
B. Paden et al., "Optimal Kinematic Design of 6R Manipulators", *The International Journal of Robotics Research*, Mar./Apr. 1988, vol. 7, No. 2, pp. 43–61.
G. Sahar et al., "Planning of Minimum–Time Trajectories for Robot Arms", *The International Journal of Robotics Research*, Fall 1986, vol. 5, No. 3, pp. 90–100.
O. Ma et al., "The Concept of Dynamic Isotropy and Its Applications to Inverse Kinematics and Trajectory Planning", *1990 IEEE International Conference on Robotics and Automation*, May 13–18, 1990, pp. 481–486.
B. Nelson et al., "Optimizing the Location of Assembly Tasks in a Manipulator's Workplace", *Journal of Robotic Systems*, Dec. 1990, vol. 7, No. 6, pp. 791–811.
A. Hemami et al., "A Case Study of Two–Robot–Arm Workcell Material Handling", *Journal of Robotic Systems*, 1991, vol. 8, No. 1, pp. 21–37.

(List continued on next page.)

Primary Examiner—Samuel Broda
Assistant Examiner—K Thangavelu
(74) Attorney, Agent, or Firm—Victor J. Geraci; Clifford Chance US LLP

(57) ABSTRACT

A method and system for optimizing the placement of a robot in a workplace so as to minimize cycle time is defined. A modified simulated annealing method (SA) is applied to the problem of robot placement in CAD systems, in the context of welding tasks. The objective function for optimization is cycle time, which can be obtained from available robotic CAD software. The research domains are simplified, and the SA method is applied to yield an optimal or near-optimal solution to each problem. To obtain the optimal placement of the robot, the research domain is first simplified by determining an acceptable base location domain, then obstacle shadows, which are subtracted from the previous domain to give the free acceptable base location domain. A modified SA method is applied to this domain, using task feasibility tests before simulating the cycle time, in order to save CPU time. The modified SA technique gives a set of near-optimal placements, together with other local minima, and an estimate of an efficient region where the robot may be positioned.

4 Claims, 17 Drawing Sheets

OTHER PUBLICATIONS

P. Borrel et al., "A Study of Multiple Manipulator Inverse Kinematic Solutions with Applications to Trajectory Planning and Workspace Determination", *1986 IEEE International Conference on Robotics and Automation*, Apr. 7–10, 1986, vol. 2, pp. 1180–1186.

F. Park, "On The Optimal Kinematic Design of Spherical and Spatial Mechanisms", *1991 IEEE International Conference on Robotics and Automation*, Apr. 9–11, 1991, pp. 1530–1535.

T. Lueth, "Automated Planning of Robot Workcell Layouts", *1992 IEEE International Conference on Robotics and Automation*, May 12–14, 1992, pp. 1103–1108.

Y. Edan et al., "Near–Minimum–Time Task Planning for Fruit–Picking Robots", *IEEE Transactions on Robotics and Automation*, Feb. 1991, vol. 7, No. 1, pp. 48–56.

J.A. Pamanes et al., "Optimal Placement of Robotic Manipulators Using Multiple Kinematic Criteria", *1991 IEEE International Conference on Robotics and Automation*, Apr. 9–11, 1991, pp. 933–938.

B. Fardanesh et al., "Minimum Cycle Time Location of a Task in the Workspace of a Robot Arm", $27^{th}$ *IEEE Conference on Decision and Control*, Dec. 7–9, 1998, vol. 3 of 3, pp. 2280–2283.

B. Nelson et al., "Locating Assembly Tasks in a Manipulator's Workspace", *1987 IEEE International Conference on Robotics and Automation*, Mar. 31–Apr. 3, 1987, vol. 3, pp. 1367–1372.

B. Faverjon et al., "The Mixed Approach for Motion Planning: Learning Global Strategies from a Local Planner", *International Joint Conferences on Artificial Intelligence, Inc.*, Aug. 23–28, 1987, pp. 1131–1137.

J. Hemmerle et al., "Optimal Path Placement for Kinematically Redundant Manipulators", *1991 IEEE International Conference on Robotics and Automation*, Apr. 9–11, 1991, pp. 1234–1244.

J. Borenstein et al., "Task–Level Tour Plan Generation for Mobile Robots", *IEEE Transactions on System, Man, and Cybernetics*, Aug. 1990, vol. 20, No. 4, pp. 938–943.

H. Geering et al., "Time–Optimal Motions of Robots in Assembly Tasks", $24^{th}$ *IEEE Conference on Decision & Control*, Dec. 11–13, 1998, vol. 2 of 3, pp. 982–989.

S. Dubowsky et al., "Planning Time–Optimal Robotic Manipulator Motions and Work Place for Point–to–Point Tasks", *IEEE Transactions on Robotics and Automation*, Jun. 1989, vol. 5, No. 3, pp. 377–381.

P. Wenger et al., "Ability of a Robot to Travel Through its Free Work Space in an Environment with Obstacles", *The International Journal of Robotics Research*, Jun. 1991, vol. 10, No. 3, pp. 214–227.

S. Manoochehri et al., "A Computer–Based Methodology for the Form Synthesis and Optimal Design of Robot Manipulators", *Journal of Mechanical Design*, Dec. 1990, vol. 112, pp. 501–508.

S. Kirkpatrick et al., "Optimization by Simulated Annealing", *Science*, May 13, 1983, vol., 220, No. 4598, pp. 671–680.

N. Metropolis et al., "Equation of State Calculations by Fast Computing Machines", *The Journal of Chemical Physics*, Jun. 1953, vol. 21, No. 6, pp. 1087–1092.

S. Chiu, "Task Compatibility of Manipulator Postures", *The International Journal of Robotics Research*, Oct. 1988, vol. 7. No. 5, pp. 13–21.

R. Chang et al., "VLSI Circuit Placement with Rectilinear Modules using Three–Layer Force–Directed Self–Organizing Maps", *IEEE Transactions on Neural Networks*, Sep. 1997, vol. 8, No. 5, pp. 1049–1064.

K. Tam, "Genetic Algorithms, Function Optimization, and Facility Layout Design", *European Journal of Operational Research*, Dec. 10, 1992, vol. 63, No. 2, pp. 322–346.

A. Kusiak et al., "The Facility Layout Problem", *European Journal of Operational Research*, Jun. 1987, vol. 29, No. 3, pp. 229–251.

S. Sahni et al., "P–Complete Approximation Problems", *Journal of the Association for Computing Machinery*, Jul. 1976, vol. 23, No. 3, pp. 555–565.

S. Chittajalu et al., "Layout Design for Robotic Assembly Workcells", *Technical Paper SME*, A086 409, Apr. 20–24, 1986, pp. 7–59, 7–61 through 7–69.

K. Kado et al., "A Study of Genetic Algorithm Hybrids for Facility Layout Problems", *Proceedings of the International Conference on Genetic Algorithms*, 1995, pp. 498–505.

A. Smith et al., "Genetic Optimization Using a Penalty Function", *Proceedings of the Fifth International Conference on Genetic Algorithms*, Jul. 17–21, 1993, pp. 499–505.

C. Sechen, "Chip–Planning, Placement, and the Global Routing of Macro/Custom Cell Integrated Circuits Using Simulated Annealing", $25^{th}$ *ACM/IEEE Design Automation Conference*, Jun. 12–15, 1988, Paper 5.4, pp. 73 80.

Y. Kim et al. "Stepwise–Overlapped Parallel Annealing and it's Application to Floorplan Designs", *Computer–Aided Design*, Mar. 2, 1991, vol. 23, No. 2, pp. 133–144.

B. Ngoi et al., "A Fast Spatial Representation Method (Applied to Fixture Design)", *Advanced Manufacturing Technology*, 1993, vol. 8, No. 2, pp. 71–77.

J. Cagan et al., "A Simulated Annealing–Based Algorithm Using Hierachical Models for General Three–Dimensional Component Layout", *Computer–Aided Design*, Sep. 1, 1998, vol. 30, No. 10, pp. 781–790.

M. Bazaraa et al., "A Branch–and–Bound–Based Heuristic for Solving the Quadratic Assignment Problme*", *Naval Research Logistics Quarterly*, Jun. 1983, vol. 30, No. 2, pp. 287–304.

K. Tam, "A Simulated Annealing Algorithm for Allocating Space to Manufacturing Cells", *International Journal of Product Research*, 1992, vol. 30, No. 1, pp. 63–87.

. Scriabin et al., "A Cluster–Analytic Approach to Facility Layout", *Management Science*, Jan. 1985, vol. 31, No. 1, pp. 33–49.

R. Burkard et al., "Numerical Investigations on Quadratic Assignment Problems", *Naval Research Logistics Quarterly*, Mar. 1978, vol. 25, No. 1, pp. 129–148.

Z. Drezner et al., "On Optimizing Bin Picking and Insertion Plans for Assembly Robots", *IIE Transactions*, Sep. 1984, vol. 16, No. 3, pp. 262–270.

P. Chedmail et al., "Design and Positioning of a Robot in an Environment with Obstacles using Optimal Research", *1989 IEEE International Conference on Robotics and Automation*, vol. 2, pp. 1069–1074.

D. Barral et al., "Development of Optimisation Tools in the Context of an Industrial Robotic CAD Software Product", *International Journal of Advanced Manufacturing Technology*, Aug. 31, 1999, vol. 15, Issue 11, pp. 822–831.

D. Barral et al., "Stimulated Annealing Combined with a Constructive Algorithm for Optimising Assembly Workcell Layout", *Advanced Manufacturing Technology*, 2001, vol. 17, pp. 593–602.

D. Barral et al., "An Evolutionary Stimulated Annealing Algorithm for Optimizing Robotic Task Point Ordering", *1999 IEEE International Symposium on Assembly and Task Planning*, Jul. 1999, pp. 157–162.

C. Zhao et al., "Collision–Free Path Planning for a Robot with Two Arms Cooperating in the 3–D Work Space", *1996 IEEE International Conference on Robotics and Automation*, Apr. 22, 1996, pp. 2835–2840.

B. Faverjon, "A Practical Approach to Motion–Planning for Manipulators with Many Degrees of Freedom", *Robotic Research, International Symposium*, Aug. 28, 1989, pp. 425–433.

K. Tam, "A Simulated Annealing Algorithm for Allocating Space to Manufacturing Cells", *International Journal of Production Research*, Jan. 1992, vol. 30. No. 1, pp. 63–87.

U. Roβgoderer et al., "A Concept for Automated Layout Generation", *IEEE International Conference on Robotics and Automation*, May 21, 1995, pp. 800–805.

C. Sechen, "VLSI Placement and Global Routing Using Simulated Annealing", 1988, pp. 1–278.

European Search Report for EP 00 40 2718, Oct. 3, 2001.

Carriker et al., "An approach for coordinating mobility and manipulation", IEEE International Conference on Systems Engineering, 1989.*

Martinez–Alfaro et al., "Collision –free path planning for mobile robots and/or AGVs using simulated annealing", IEEE International Conference on System, Man and Cybernatics, 1994.*

Lee, S; Kardaras, G. "Collision –free path planning with neural networks", Proceedings of International Confrence on Robotics and Automation, 1997.*

Lee et al. "Geometric collision detection and potential field based delay planning for dual arm systems", International Conference on Robotics and Automation, 1997.*

Hsu et al., "Placing a robot manipulator amid obstacles for optimized execution", Proceedings of the IEEE International symposium on Assembly and task Planning, Jul. 1999.*

* cited by examiner

OPTIMIZATION TOOL FOR ROBOT PLACEMENT

BACKGROUND

The present invention relates to computer software utility programs, and more specifically to programs in the field of computer aided design (CAD), computer aided manufacturing (CAM), and computer aided engineering (CAE), and in particular the use of such systems for determining the proper physical location of robots in a manufacturing facility.

Robots are used extensively in automated manufacturing processes. Robots can be employed to perform repetitive tasks in a precise and time efficient manner. For example, robots are employed in automobile production lines to apply spot welds to automobile frames, resulting in more precise placement of welds, in a more time efficient manner, than can be accomplished through the use of manual labor. In a typical manufacturing process, a robot performs a repetitive sequence of point-to-point movements, coming to a stop at each point. For example, the robot will apply a spot weld to an assembly at each programmed stop location. As used herein, the term "work point" means each stop location at which work is to be performed by the robot on a workpiece. The term "workplan" refers to a set of work points, and "trajectory" refers to the path taken by the robot end-effector when moving directly from one work point to the next in the workplan.

The productivity of a robot can be improved considerably by minimizing the cycle time for completing a workplan. For a given robot, cycle time depends on many parameters, such as the position of the manipulator relative to the task, the sequence in which the points are visited, the maximum velocities and accelerations of the actuators, the relative position of the points, and the configuration of the robotic arm. A robot ill-placed at its workstation risks inefficient operation and even failure. Thus, there is a need for a system for choosing robot position so that cycle time can be minimized for a specified workplan.

Existing CAD systems can be used to model a manufacturing facility including robots. Such CAD systems, when equipped with data detailing the configuration of the items upon which work will be performed, the configuration of objects in the workplace environment, and the configuration of the robots themselves, are used to model the workplace. Each item can be placed within the workplace graphically for the purpose of modeling the facility. Robots can then be moved graphically to check for task feasibility and efficiency. In known CAD systems, calculating the cycle time for a given workplan involves a time consuming trail and error loop, which is to be carried out by the user, in which the robotic movement is simulated graphically. To reduce cycle time, the operator must choose a set of proposed robot base positions, and then run a simulation of the robot movement for each proposed robot base position to obtain a comparison of position feasibility and cycle time. This involves extensive CPU time and is inefficient.

There is therefore a need for an easy-to-use system for optimizing robot position to achieve a low cycle time, which does not involve a time-consuming iterative process which must be performed by the user.

SUMMARY OF THE INVENTION

Accordingly, the present invention provides a system, method and apparatus for finding the optimal possible placement of the base of a robot with respect to a workpiece in an efficient manner. Optimal placement is defined as the placement which will allow the robot manipulator tool to be moved through its trajectory for a given workplan in a minimum amount of time. To find the optimum location, an area containing a number of possible locations for robot base placement is searched using an optimization algorithm. According to an aspect of the invention, the area to be searched containing the possible robot base locations is minimized so that the number of possible base locations to test, or "search", for optimization is reduced. A first step in minimizing the search space consists of calculating an "acceptable robot base location domain". This domain defines an area within a horizontal plane in which the robot base must be placed so that the manipulator tool of the robot will be able to reach each of the intended work points in the workplan to be performed by the robot. The factors determining this domain are the location of all the work points, and the geometry and kinematic profile of the robot.

Following the identification of the acceptable robot base location domain, according to an aspect of the invention, it is necessary to take into account the potential for collisions between the robot and its environment. To achieve this goal, a method of defining "obstacle shadows" is presented, such obstacle shadows representing portions of the acceptable robot base location domain where the robot cannot be placed because doing so would result in collisions between the robot and objects in its environment when the manipulator tool is extended to a work point in the workplan. The object of the method is to find and define the "obstacle shadow's" outline, by moving the robot's base in horizontal sections of the acceptable base location domain and testing for collisions. The "obstacle shadows" are subtracted from the acceptable base location domain, reducing its size, and therefore the number of possible base location positions to be searched during optimization. According to the method of the invention, after defining a global path to be followed, the robot's base is moved step by step to achieve a goal point, normally, a work point in the workplan. When a collision is encountered, the direction of displacement is modified, and the global path for the next iteration is then redefined. This step is repeated until the goal point is reached. By moving around the obstacle shadow on the left and then on the right, a set of points from which the closed contour of the shadow can be deduced is obtained. As stated above, the closed contour of the shadow is then subtracted from the acceptable robot base location domain, resulting in a "free acceptable base location domain". When the robot base is placed anywhere within the free acceptable base location, the robot tool can reach each point where work is to be performed, i.e., each work point, without being restricted by objects in its environment. According to an aspect of the invention, the set of possible base locations may be further reduced using standard functionality available in CAD systems, such as the "collision testing" function of the "CATIA Design and Robot Programming Solution" system sold by Dassault-Systèmes of Suresnes, France. Such functionality is used to determine whether collisions will occur while the robot arm is moving from work point to work point. Locations that would result in collisions are removed from consideration. According to another aspect of the invention, using standard functionality available in CAD systems, tests can be conducted to determine if re-configuration of the robot is required to move from work point to work point along the trajectory. Results that would result in reconfiguration are also removed from consideration.

Having defined a free acceptable base location domain, it is then desirable to identify specific locations within the domain for robot base placement which will achieve a minimized cycle time. According to an aspect of the invention, a modified "simulated annealing" method is employed to find a set of optimal positions for the robot base for minimum cycle time. The classic simulated annealing algorithm will be familiar to a person of skill in the art, and is described, for example, at S. Kirkpatrick, C. D. Gelatt, Jr. and M. P. Vecchi, 'Optimization by Simulated Annealing', Science, 220 (4598), pp. 671–680, May 1983. The conventional simulated annealing algorithm can only yield a single and isolated optimal solution to the problem, which is not satisfactory in the context of an industrial CAD system. Furthermore, simulated annealing may require long computation times, as it cannot distinguish a local minimum from an ordinary solution, unless it visits the very bottom of the local minimum. According to the invention, two features were added to the conventional simulated annealing method to build some "opportunism" into the method.

The first feature is the use of what has been termed a "freeze-heat" cycle, which corresponds to regular application of local search procedures. This feature is aimed at exploring a minimum valley as fast as possible and yields the closest local minimum in the search space. The second feature is the memorization of the local minima and their "attraction areas". In this way, a minimum valley is not revisited once it has been explored, and other minima can be obtained. Such modifications yield a set of near-optimal solutions at the end of execution, together with the knowledge of their respective neighborhoods. Using this modification, there is no guarantee that the single absolute optimal location for the robot base will be found. Instead, a set of near-optimal solutions will be obtained, using substantially less computational resources than would be necessary using a classic simulated annealing method.

DETAILED DESCRIPTION OF THE INVENTION

Figure 16:
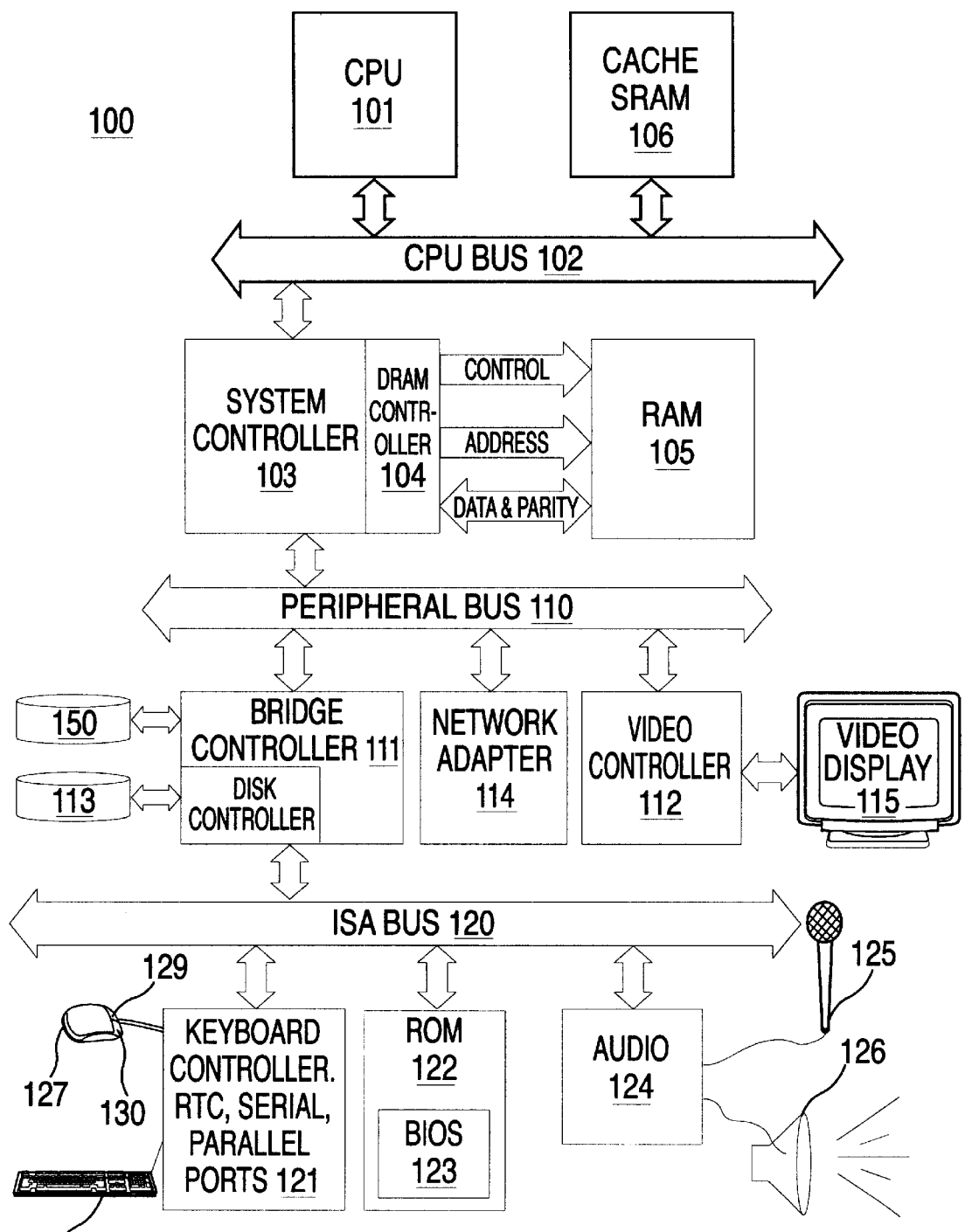
FIG. 16 is a block diagram of a computer system capable of use with the present invention.

Referring to FIG. 16 physical resources of a computer system 100 capable of use in practicing the present invention are depicted. The computer 100 has a central processor 101 connected to a processor host bus 102 over which it provides data, address and control signals. The processors 101 may be any conventional general purpose single-chip or multi-chip microprocessor such as a Pentium® series processor, a K6 processor, a MIPS® processor, a Power PC® processor or an ALPHA® processor. In addition, the processor 101 may be any conventional special purpose microprocessor such as a digital signal processor or a graphics processor. The microprocessor 101 can have conventional address, data, and control lines coupling it to a processor host bus 102.

The computer 100 can include a system controller 103 having an integrated RAM memory controller 104. The system controller 103 can be connected to the host bus 102 and provide an interface to random access memory 105. The system controller 103 can also provide host bus to peripheral bus bridging functions. The controller 103 can thereby permit signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a hard disk drive control interface 111 coupled to a hard disk drive 113, a video display controller 112 coupled to a video display 115, and a keyboard and mouse controller 121 can be coupled to a bus 120 and controlled by the processor 101. The computer system can include a connection to a computer system network, an intranet or an internet. Data and information may be sent and received over such a connection.

The computer 100 can also include nonvolatile ROM memory 122 to store basic computer software routines. ROM 122 may include alterable memory, such as EEPROM (Electronically Erasable Programmable Read Only Memory), to store configuration data. BIOS routines 123 can be included in ROM 122 and provide basic computer initialization, systems testing, and input/output (I/O) services. The BIOS 123 can also include routines that allow an operating system to be "booted" from the disk 113. Examples of high-level operating systems are, the Microsoft Windows 98™, Windows NT™, UNIX, LINUX, the Apple MacOS™ operating system, or other operating system.

An operating system may be fully loaded in the RAM memory 105 or may include portions in RAM memory 105, disk drive storage 113, or storage at a network location. The operating system can provide functionality to execute software applications, software systems and tools of software systems. Software functionality can access the video display controller 112 and other resources of the computer system 100 to provide models of designs, robot configurations, workplaces, and workplace environments on the video computer display 115.

Robot Placement Optimization

The performance of a robot manipulator during a task depends on its position, relative to the corresponding track. A manipulator ill-placed at its workstation risks inefficient operation. This leads to the problem of choosing the position in such a way that manipulator performance is optimized while a specified task is accomplished.

In existing robotic CAD systems, calculating the cycle time requires the simulation of the task, which is a very time-consuming operation. According to the present invention, this task is made more efficient by simplifying the search space before applying an optimization algorithm, such as the simulated annealing method of the present invention. This is accomplished by defining an "acceptable robot base location domain" from which a robot can reach each of a set of given welding points, and defining "obstacle shadows", which represent the regions of the acceptable base location domain where the robot cannot be placed because of potential collisions with an obstacle. The obstacle shadows are subtracted from the acceptable base location domain to obtain a free acceptable base location domain.

Figure 1:
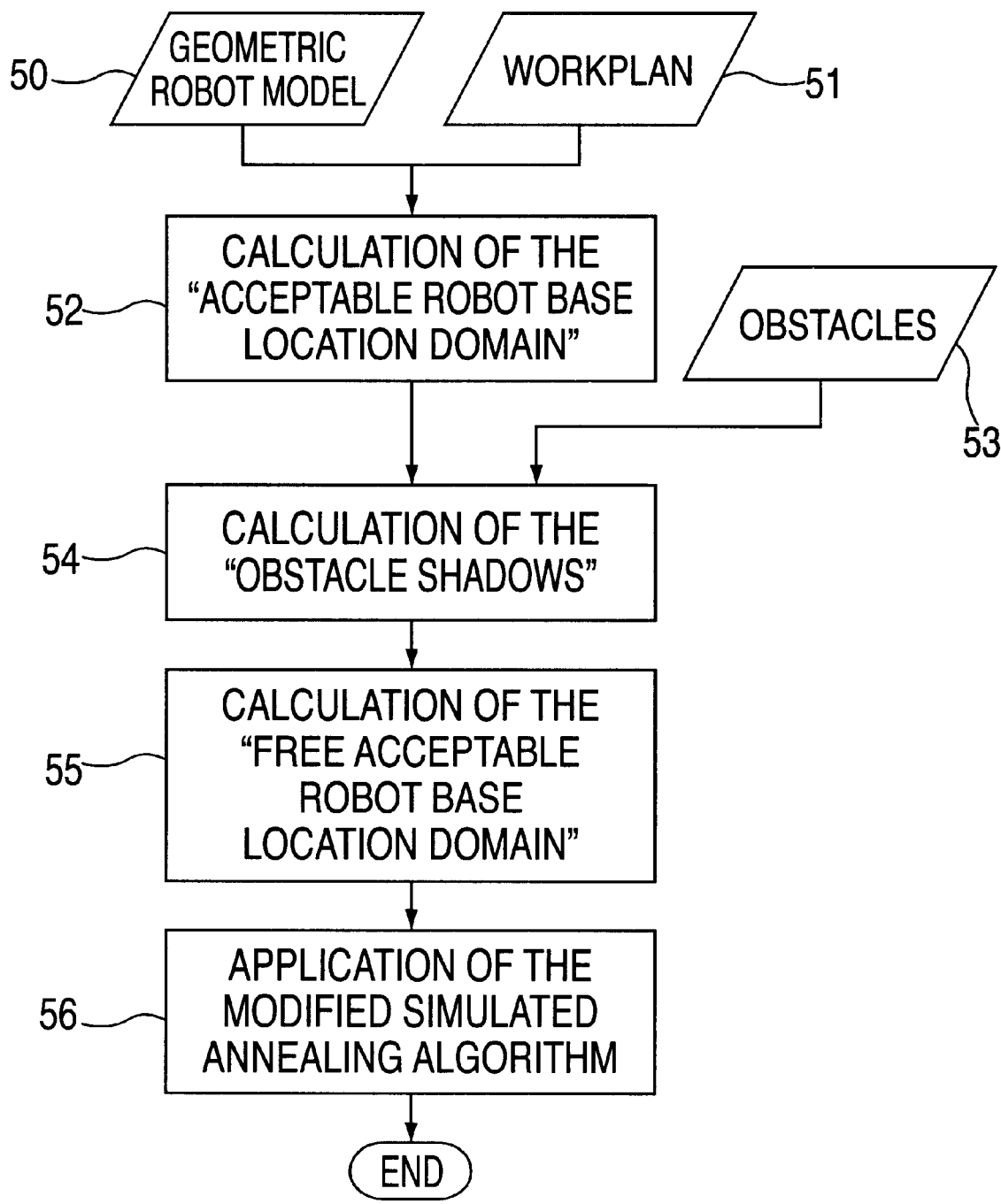
FIG. 1 is a schematic representation of the system of the invention.
Figure 2:
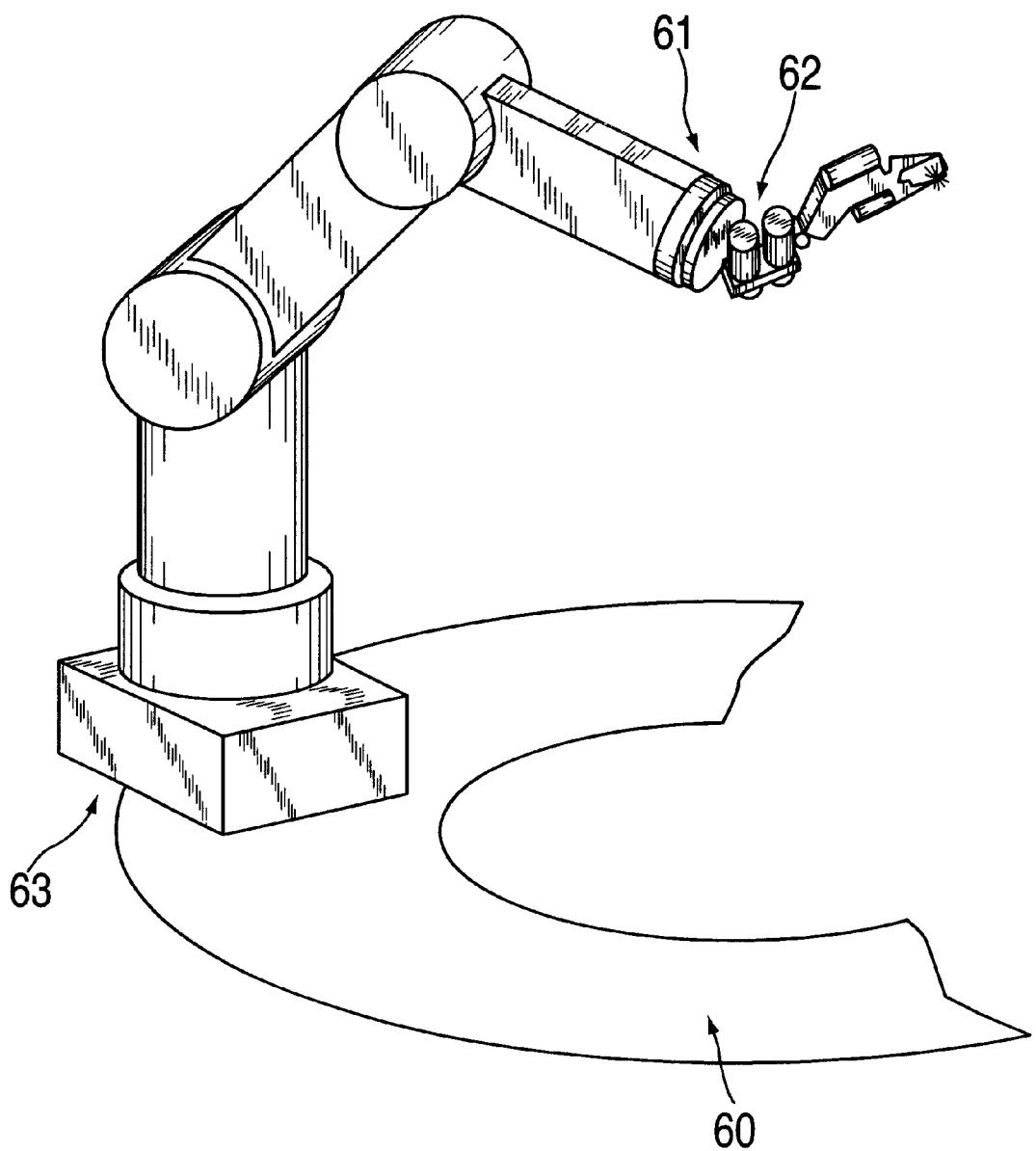
FIG. 2 is a graphic depiction of a robot, with its base positioned within an acceptable base location domain, in a horizontal plane, according to the present invention.

Referring to FIG. 1, a schematic representation of the method of the present invention is shown. The system uses data stored either within the system, or external to the system, relating to the geometry of the specific robot model 50, and the workplan for the manipulator tool 51. As stated above, the workplan consists of a set of discrete locations in a coordinate system where work, such as the application of spot welds, is to be performed. The geometry of the robot model is necessary to determine the kinematic properties of the movement of the robot arm within the coordinate system. Using standard functionality with existing CAD systems, such as the "collision testing" function of the "CATIA Design and Robot Programming Solution" system sold by Dassault-Systèmes, Suresnes, France, an "acceptable robot base location domain" is calculated, as represented in box 52 of FIG. 1. FIG. 2 shows a graphic representation of an example of an acceptable base location domain, labeled 60, for a specific workplan.

Figure 3:
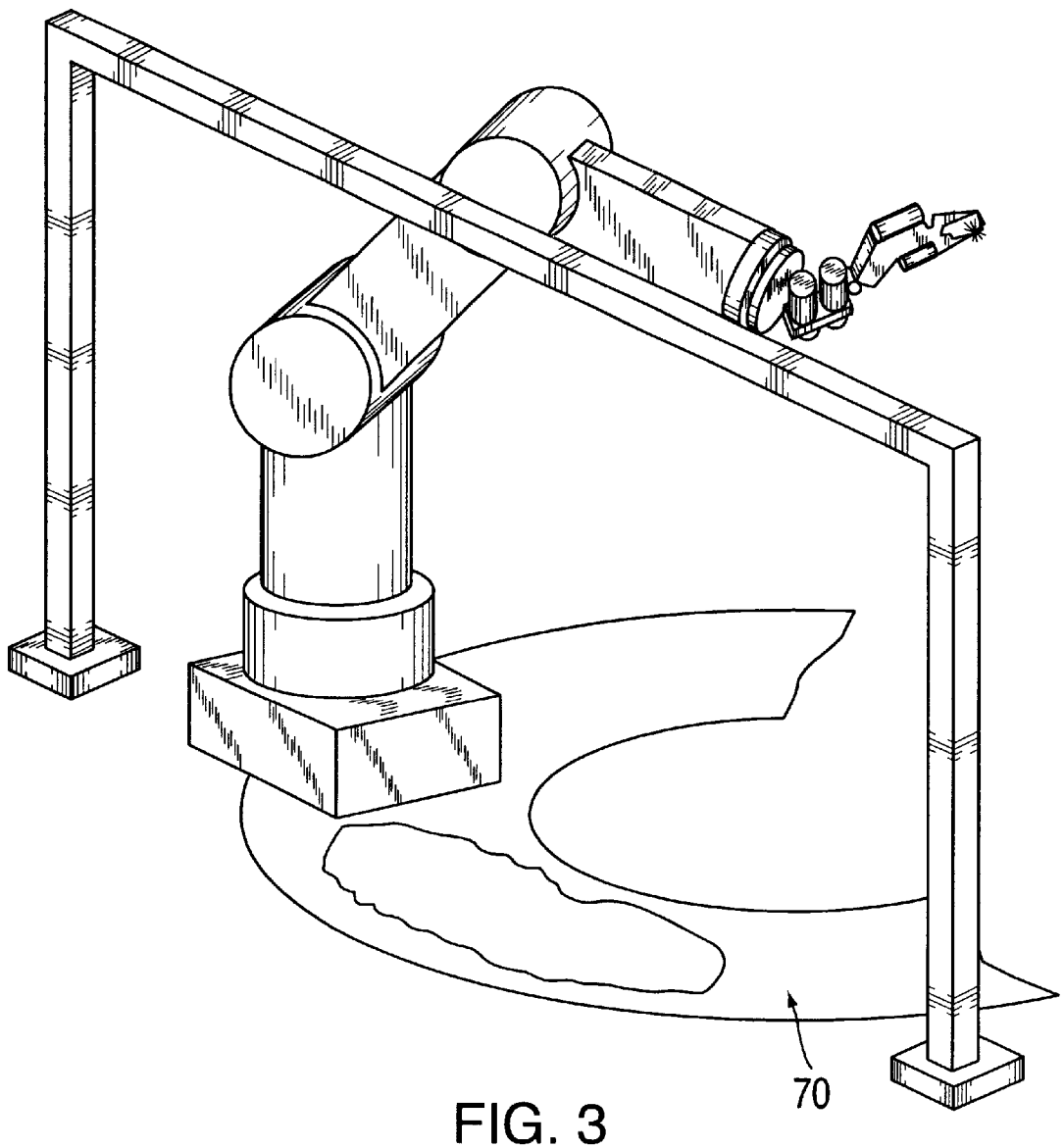
FIG. 3 is a graphic depiction of a robot, with its base positioned within a free acceptable base location domain, in a horizontal plane, according to the present invention.

Again referring to FIG. 1, data 53 is retrieved defining the locations and geometries of obstacles within the coordinate system of the workspace. This data is used, using a method to be described in more detail below, to calculate "obstacle shadows" in step 54. In step 55, the obstacle shadows are subtracted from the acceptable base location domain to calculate the "free acceptable base location domain", an example of which is shown in FIG. 3 as 70. Referring to FIG. 1, optimization, i.e., finding a discrete number of locations within the free acceptable base location domain for which robot task cycle time is minimized, is performed using a modified simulated annealing method in step 56.

Acceptable Base Location Domain

Figure 4:
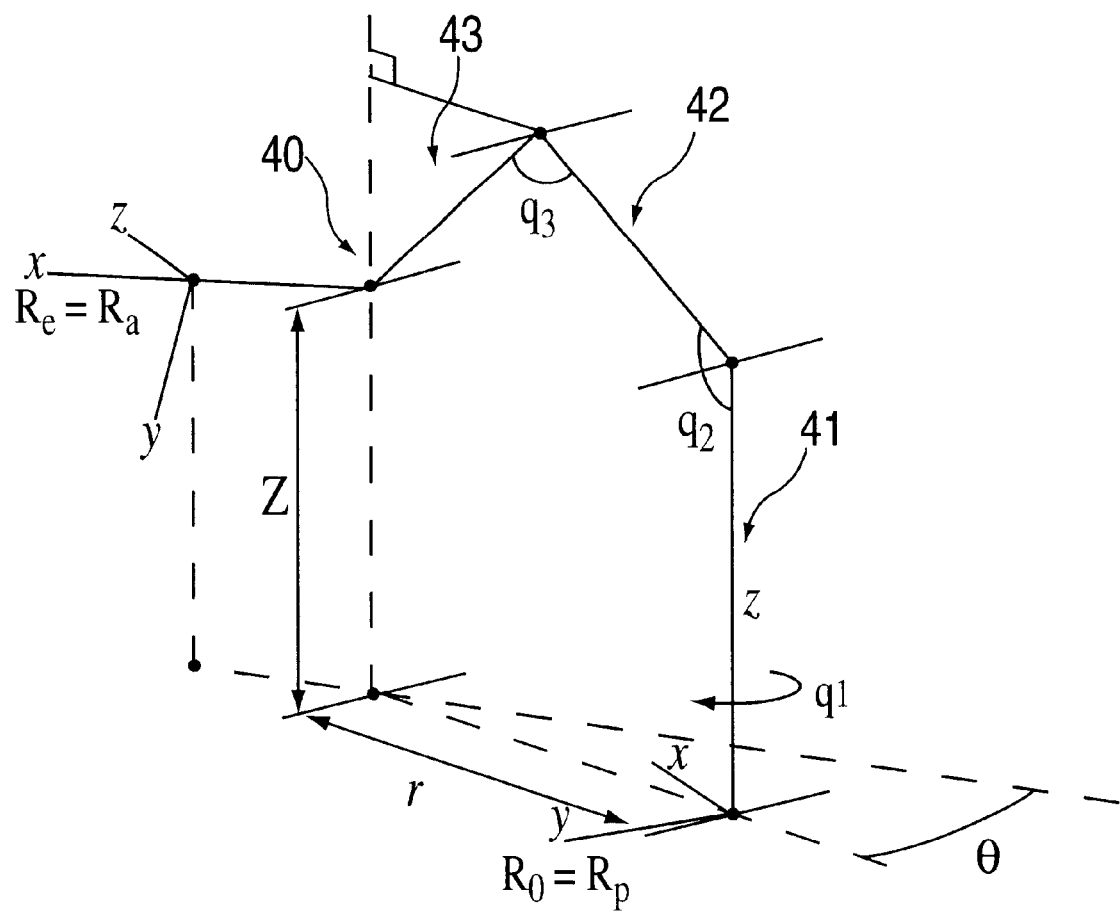
FIG. 4 is a graphic depiction of a robot located within a coordinate system, showing its axes of movement.
Figure 17:
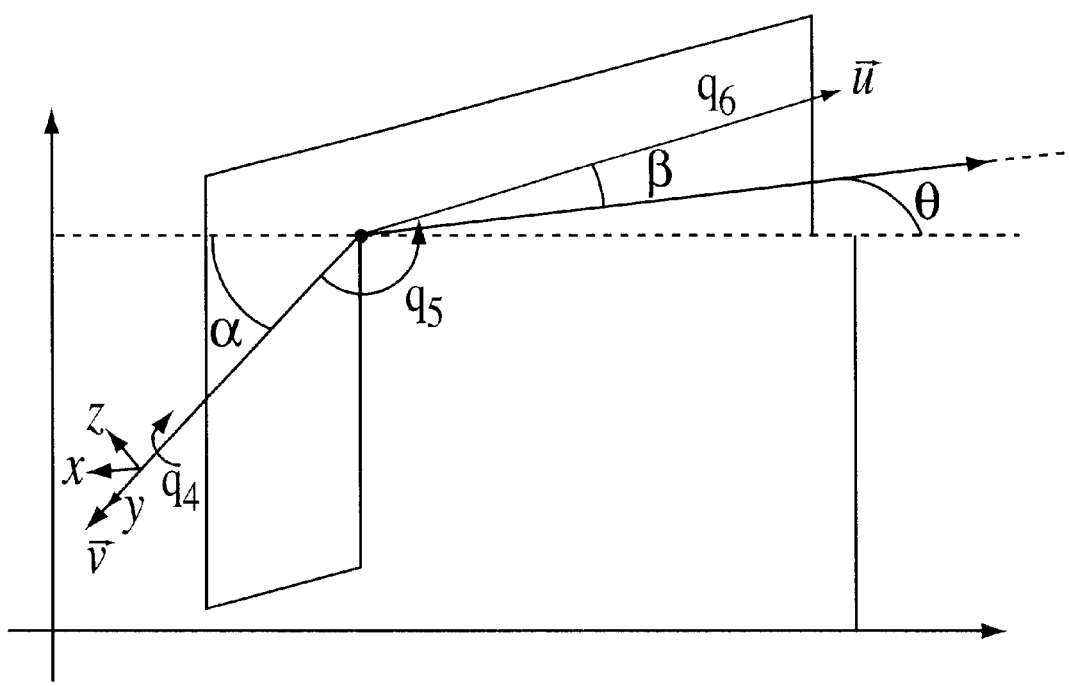
FIG. 17 is a graphic depiction of a the wrist joint coordinate system of a robot, which provides the analytical framework for determining the acceptable base location domain.

Referring to FIGS. 2, 4 and 17, the method of determining an acceptable base location is described in detail. As stated, an acceptable base location domain is a portion of a plane which, when the robot base is located therein, allows the robot manipulator to reach each work point in a given workplan. To determine this domain, the physical geometry and kinematics of the robot must be considered. The approach is based on physical observation of a given robot manipulator that must reach a 6-dimensional reference frame in the work space. For current industrial robots (6 axes with 3 orthogonal intersecting axes for the wrist), the primary arm (first three axes fixing the position, FIG. 4, items 41, 42 and 43), and the wrist (last three axes fixing the orientation) can be disassociated.

Referring to FIG. 4., we define $R_0$ as the reference frame for the base of the robot, $R_p$ as the reference frame for the center of the robot's wrist, $R_e$ as the reference frame for the end of the effector or tool reference, and $R_a$ as the reference frame linked to the welding point to be reached. The orientation of $R_0$ with respect to $R_p$ can be conveniently determined using a cylindrical coordinate system $(r, \theta, z)$, when $R_e$ and $R_a$ coincide.

In this coordinate system, we obtain the following system of equations for a 3-axis primary arm:

$$\begin{cases} r = l_2 \times \sin(q_2) - l_3 \times \sin(q_2 + q_3) \\ z = l_1 - l_2 \times \cos(q_2) + l_3 \times \cos(q_2 + q_3) \\ \theta = q_1 \end{cases}$$

where $l_i$ is the length of the segment i of the arm, and $q_i$ is the value of articulation i.

Using this system of equations, one can analytically compute, in horizontal planes (for which z is constant), the values of r, depending on those of $q_2$, $q_3$, or $q_2+q_3$.

The method first proceeds in two stages:

1. Analysis of the workspace of the robot base, by sweeping the joints of the primary arm within their limits (i.e. $q_{2min} < q_2 < q_{2max}$; $q_{3min} < q_3 < q_{3max}$). This analysis yields a set of circles.

2. Analysis of the limitations due to the elbow configuration (i.e. $0 < q_3 < \pi$) and the closed kinematic chains (i.e. $q_{pmin} < q_2+q_3 < q_{pmax}$). This analysis also yields a set of circles.

Then, we need to take into account the limitations of the wrist joint limits. For a wrist with 3 concurrent axes, the one used most commonly on spot welding robots, the limitation in the wrist's range of movement is due to the fact that the variation of joint $q_5$ is small in practice (i.e. $q_{5min} < q_5 < q_{5max}$). Using the notations from FIG. 17, where $\vec{u} = (\sin \theta \cos \alpha, -\cos \theta \cos \alpha, -\sin \alpha)$ is a directing vector of axis 4 and $\vec{v} = (0, \cos \beta, -\sin \beta)$ a directing vector of axis 6, the wrist constraint takes the following form:

$$\vec{u} \cdot \vec{v} < \cos(q_{5min}) \text{ and } \vec{u} \cdot \vec{v} < \cos(q_{5max})$$

Given that $$\alpha = q_2 + q_3 - \frac{3\pi}{2}$$

FIG. 17), robot base locations for which the wrist is at its limits can be calculated analytically.

Performing the analyses for each work point yields a set of plane areas, or faces, the common areas of which delimit the acceptable base location domain. These sections are represented by faces, which are parts of planes bounded by the projection of a set of curves or lines. As an example, FIG. 2 shows one of these sections 60, for one welding point and the "elbow up position". The welding point can be reached by the robot if its base is anywhere within the face. For a given set of welding points, the acceptable base location domain is the area within the plane that is common to all welding point faces.

Obstacle Shadows

At this stage in the calculations, we have a set of faces representing horizontal sections of the acceptable base location domain for a particular position of the robot's elbow. However, these sections do not take into account the collision avoidance constraint between the robot and its environment.

This requires determining the obstacle shadows, i.e. the regions of the acceptable base location domain where the robot cannot be placed because doing so would result in collisions with obstacles, as the end-effector reaches a given work point. Since we have horizontal sections of the domain, the method consists in moving the robot's base in these sections and testing for collisions.

Figure 5:
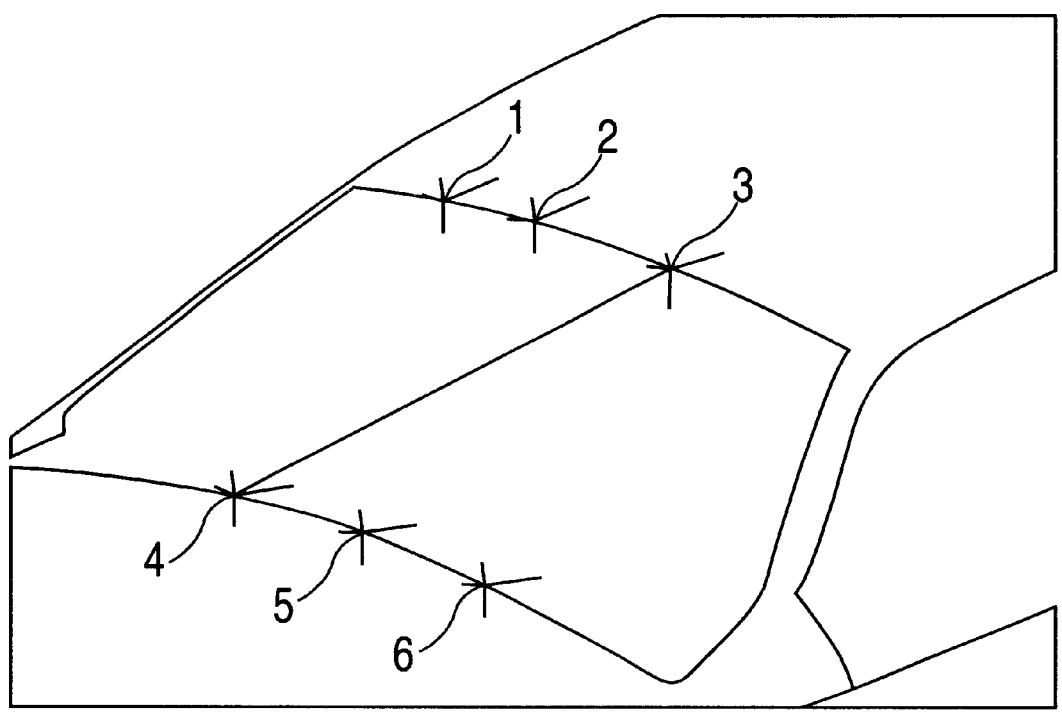
FIG. 5 illustrates an example of a trajectory to be followed by a robot end-effector to perform a task, in this case a set of spot welds around the windshield casement of an automobile.

FIG. 5 depicts an example of a set of work points (1 to 6), in this case spot-weld locations around the windshield of an automobile, in a given workplan trajectory. To determine collision avoidance, the end-effector of the robot is successively placed on each work point with an orientation that permits the collision avoidance between the wrist and the obstacles. Referring to FIG. 2, the primary arm's extremity 61 is thus hung on the corresponding wrist's center 62 and its base 63 can be moved in the sections of the acceptable base location domain 60. One method of testing for collisions would be to break the acceptable base location domain 60 into discrete sections and to test every resulting placement. However, according to the invention, some simplifications considerably reduce the number of necessary collision tests.

Figure 6:
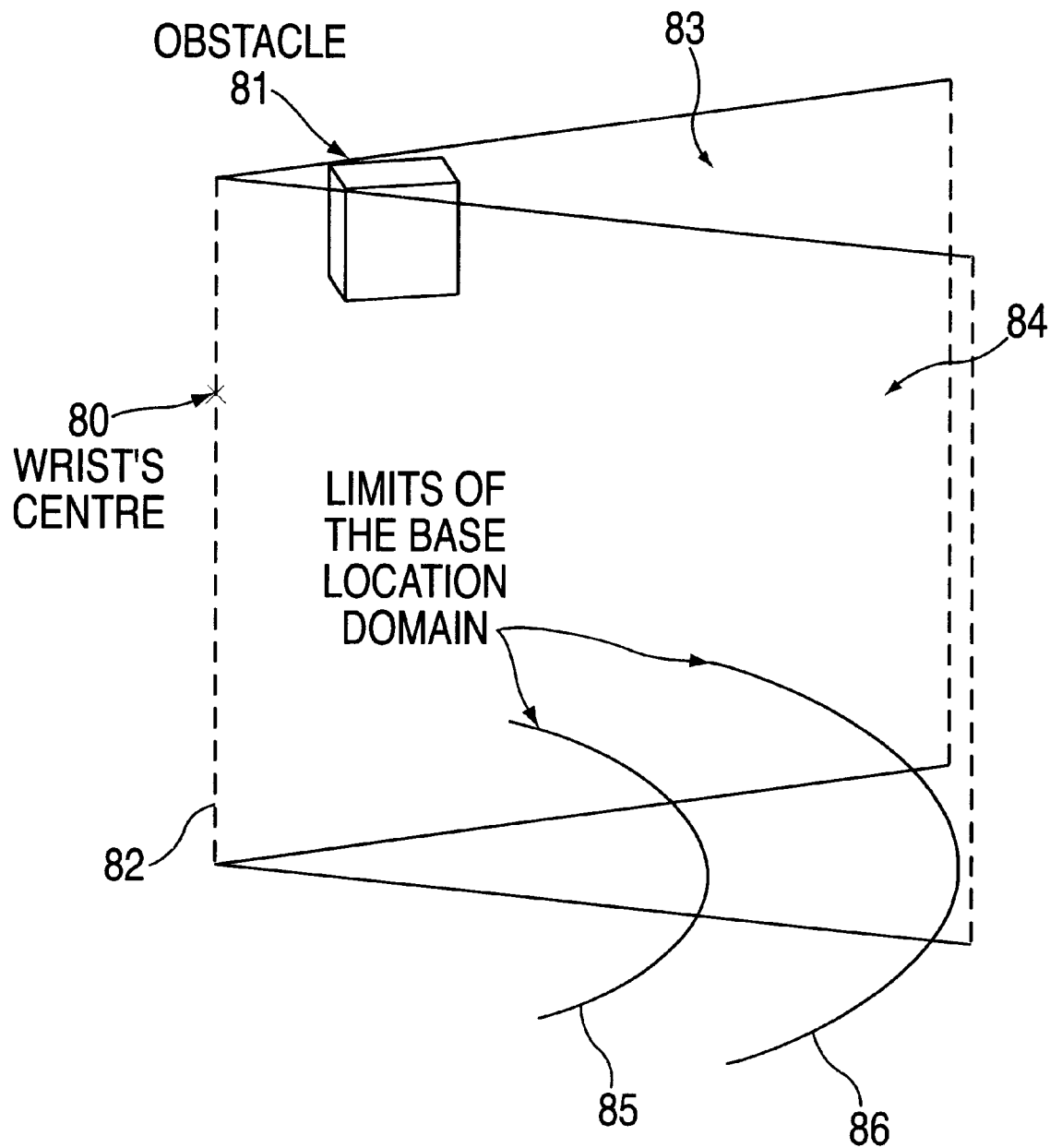
FIG. 6 illustrates an example of a "visibility sector" used in calculating "obstacle shadows" according to the present invention.

As the robot type in this example, depicted in FIG. 4, is limited to 6-axes, the wrist's center 40 can only move, for a given base placement, in the plane defined by itself and the first axis 41 of the robot. Depicted in FIG. 6 is a graphical representation of the possible movement of the wrist's center 80 according to these constraints. Collisions between the arm and the given obstacle 81 occur, at least, when the robot is placed in a "visibility sector". This sector is defined by means of the vertical line 82 passing through the wrist's center 80 when the tool is placed on a given point, and the vertical planes 83 and 84 tangent to the obstacle 81 and passing through the line 82 described above. The visibility sector is the wedge of space between planes 83 and 84. The only portion of the visibility sector which is of interest is the portion that is coincident with the acceptable base location domain, the limits of which are depicted as curves 85 and 86. The goal is to calculate the obstacle shadow's outline in order to subtract the resulting face from the base location domain.

The method employed is based on the method proposed in B. Favejon and P. Tournassoud, 'The Mixed Approach for Motion Planning: Learning Global Strategies from a Local Planner', International Joint Conference on Artificial Intelligence, pp. 1131–1137, 1987. It separates the problem into two levels. At the global level, a graph is built, the nodes of which represent relatively large cells of the configuration space of the robotics system. Given initial and goal configurations, a classical minimum cost path finding algorithm in the graph yields a list of cells giving the global path. During execution, the local path planner generates motions and tests collisions. In the event of failure, meaning that the robot is blocked while aiming at some cell, a new global path is computed, with updated weights in the graph.

Figure 7:
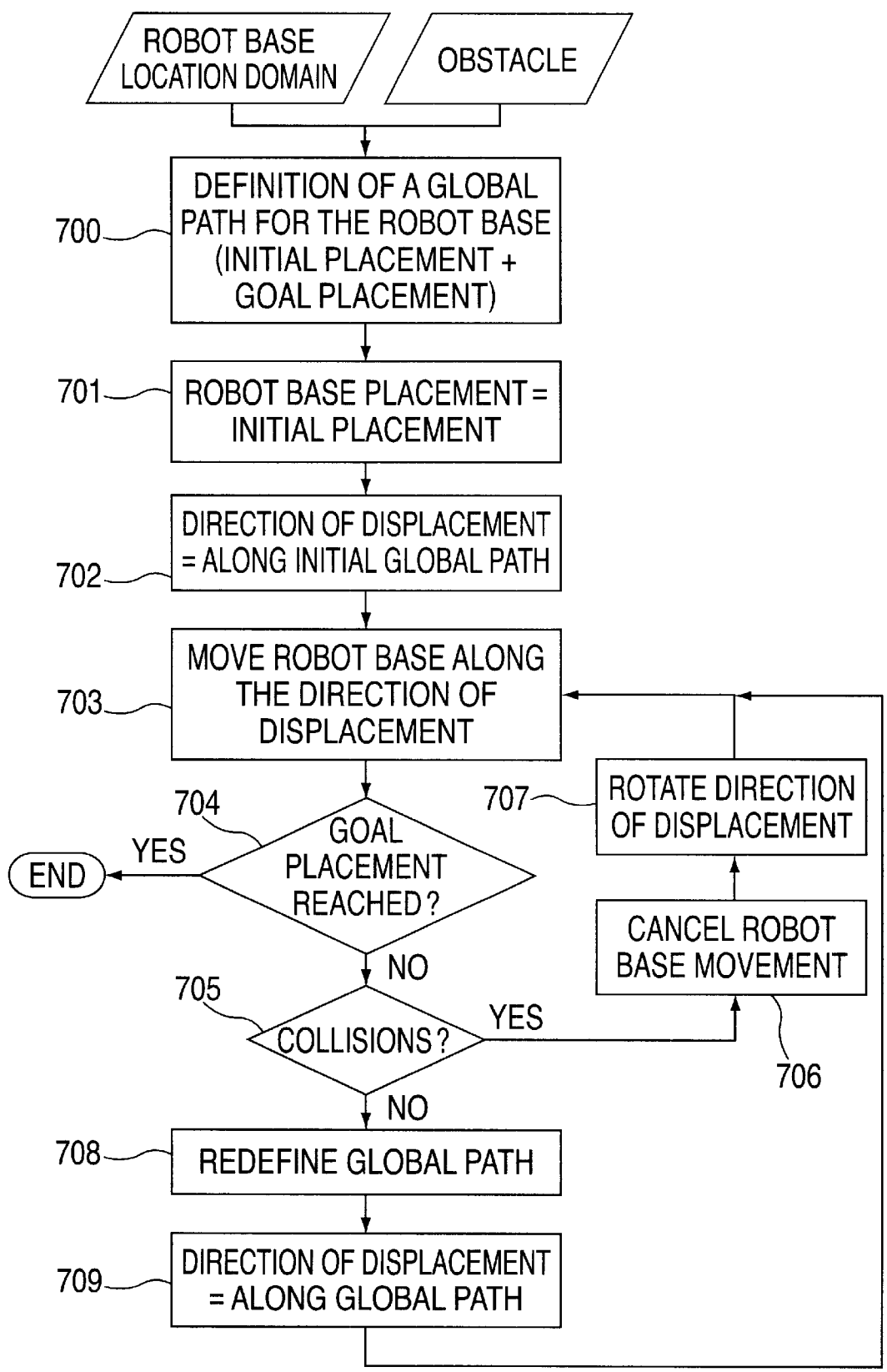
FIG. 7 is a schematic representation of the method of calculating a free acceptable base location domain, according to the present invention.
Figure 8:
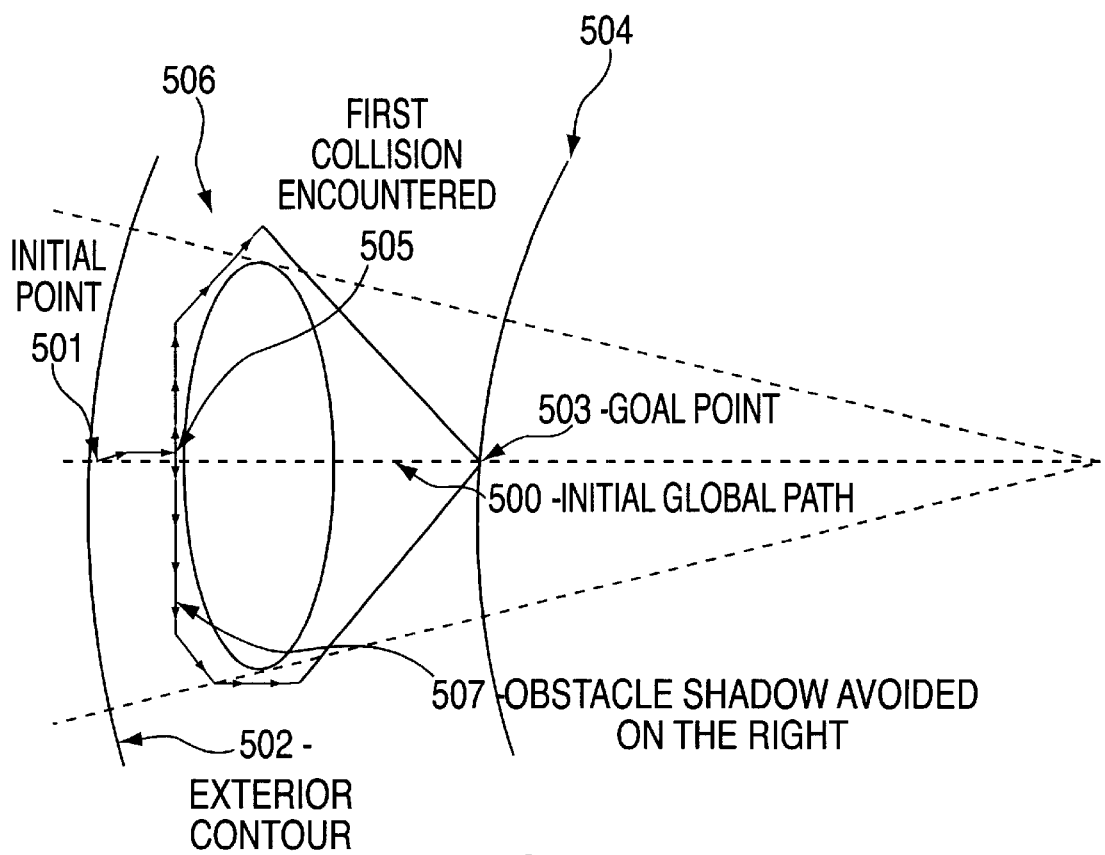
FIG. 8 is a graphic depiction of the simulated movement of the end-effector of a robot according to the method of the present invention for determining an obstacle shadow.

This approach is taken up as we move the robot's base in a section of the acceptable base location domain, with the end-effector positioned on a given welding point. The method is illustrated graphically by way of the flow chart of FIG. 7 and the illustration of FIG. 8. Referring to those figures, the method is as follows:

1. Define the global path 500 as the bisecting line of the visibility sector. The initial point 501 is derived from the intersection of this line and the exterior contour 502 of the domain section. The aim is to move the robot's base to the goal point 503 of the path. The goal point 503 is on the interior outline of the section 504. (FIG. 7, steps 700 to 702).

2. Follow this path with a given step until a collision 505 is detected (FIG. 7, steps 703 to 705).

3. As the first collision is encountered, move around the obstacle shadow on the left 506. Each time the base cannot be moved directly to the goal point 503, redefine the global path as the line joining the new base location and the goal point 503. Repeat this step until the global path can be followed again (FIG. 7, steps 703 to 707).

4. Move back to the base location 501 for which the first collision was detected (FIG. 7, step 708). Move again around the obstacle shadow on the right 507 in the same way as previously described when going around on the left.

5. In order to obtain the whole closed contour of the obstacle shadow, repeat the same process, taking as initial point the goal point 503 used in the previous steps, with the aim of reaching the location from which the previous process began. Obstacle avoidance testing lasts until a base location that was met before is met again.

By applying such a method, we get a set of points from which we can deduce the closed contour of the obstacle shadow. It is then sufficient to create a face from this outline and to subtract it from the face representing the corresponding section of the base location domain. Thus, we obtain a section of the free acceptable base location domain.

The process described above must be applied to each obstacle and to each point of the workplan. The use of the method is advantageous because it reduces the number of collision tests, as only the points neighboring the outlines of the obstacle shadows are encountered.

As a result of executing the foregoing method, a precise representation of the free acceptable base location domain is obtained, as illustrated in FIG. 3. The free acceptable base location domain 70 is a subset of the acceptable base location domain. So long as the robot base remains within the confines of the free acceptable base location domain 70, there will be no collision when the robot's tool is placed on a welding point.

Task Feasibility

Although, using the foregoing method to determine a free acceptable base location domain, all the constraints (joint limits, collisions) seem to have been taken into account, this may not be sufficient to insure task feasibility. Specifically, we know whether the robot is able to reach the points of the workplan without any collision when its base is positioned in the free acceptable base location domain. However, this location may not allow the robot to cover the whole trajectory, since it may still not be able to move freely between two consecutive points. The ability of a robot to move freely in its workspace is described in P. Wenger and P. Chedmail, 'Ability of a Robot to Travel Through its Free Workspace in an Environment with Obstacles', The International Journal of Robotics Research, 10(3), 1991. The concept of "moveability" is introduced through various properties and their corresponding necessary and sufficient conditions. These properties permit, for instance, characterization of areas where any continuous trajectory can be achieved without changing configurations.

The aim is to check whether the robot can join the points of the track. To achieve this goal with acceptable CPU times, it becomes necessary to resort to local test tools in order to evaluate the manipulator's efficiency. These tools will thus give results for a given location of the robot's base. Two cases may occur: the robot cannot join two consecutive points without reconfiguration or collisions are detected between two consecutive welding points.

Absence of Reconfiguration

Supposing that two consecutive points of the track must be reached with the same configuration, it is necessary, then, to verify whether these points can be joined by the end-effector without changing configuration. A reconfiguration may yield an increase in cycle time, and therefore should be avoided.

The points under consideration must belong to the same connected component of the configuration space. A "connected component of the configuration space" is defined by means of the aspects, as described in P. Borrel and A. Liégeois, 'A Study of Multiple Manipulator Inverse Kinematic Solutions with Applications to Trajectory Planning and to Work Space Determination', Proceedings of the IEEE International Conference on Robotics and Automation, pp. 1180–1186, 1986. Hence, a reconfiguration can be detected without executing the task.

In the event of reconfiguration, the robot's base location is thus ignored. If the path cannot be traveled without reconfiguration for any of the base locations, the optimization algorithm re-begins without using reconfiguration avoidance as a:criterion to evaluate a base placement.

Absence of Collision

The second problem that may occur is the detection of collisions while executing the task, which means that the placement is not admissible. These collisions are encountered locally by testing, before executing the task, collisions on a given set of predefined intermediate points of the trajectory. In the event of collisions, the evaluated base location is simply deleted.

If the path cannot be traveled without collisions for any of the base locations, the optimization process stops in order to allow the operator to define additional points on the trajectory. Besides, the task must be feasible for a large number of base locations, in order to justify the need for an optimization algorithm.

Simulated Annealing

As a result of the process described above, a reduced set of possible base locations is obtained which can then be tested for optimization. This is advantageous since it substantially reduces the search time for optimal base locations.

As discussed above, according to an aspect of the invention, a modified form of the known simulated annealing method is used to select a set of near-optimal base locations. These modifications will be described below, following a brief review of the simulated annealing method.

The concept of the simulated annealing method is described, for example, in S. Kirkpatrick, C. D. Gelatt, Jr. and M. P. Vecchi, 'Optimization by Simulated Annealing', Science, 220 (4598), pp. 671–680, May 1983. Simulated annealing is a term referring to a method for solving optimization problems, such as minimizing functions of many variables. Typically, this involves finding some configuration of parameters that minimizes a function, for example, cycle time, which will be referred to as cost herein.

Figure 9:
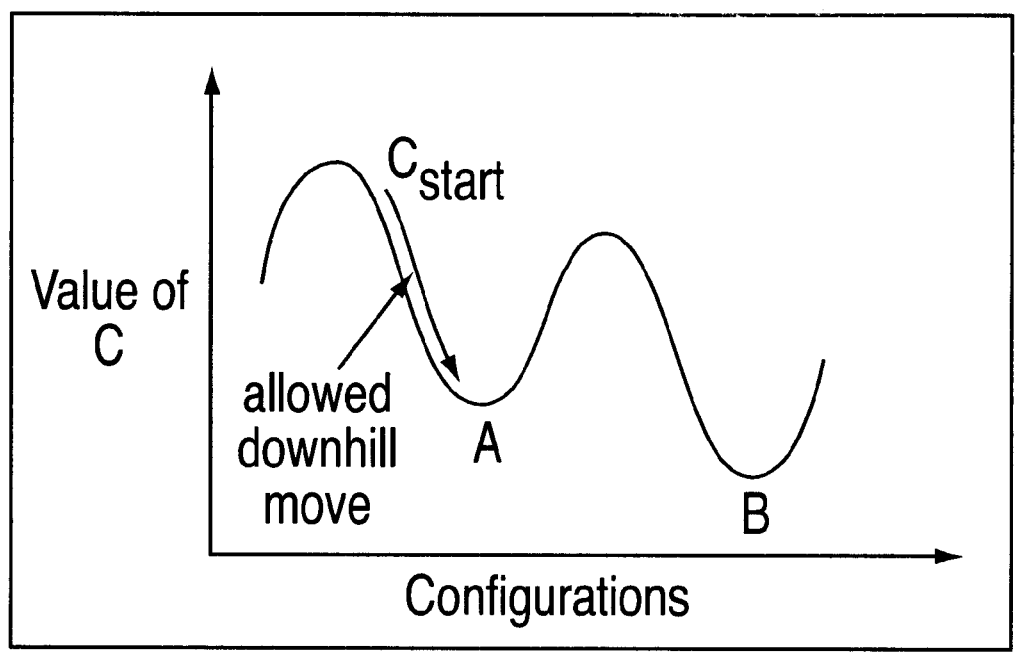
FIG. 9 illustrates the problem of determining a global minimum when local minima are present using a simple iterative method.

Simulated annealing is based on iterative improvement, which involves starting with some existing sub-optimal configuration or solution and perturbing it in a small way. If the new configuration, or solution, is better than the old one then the new solution is accepted and the process is started again. The simple iterative method is somewhat crude in that a new configuration is only accepted if it is an improvement on the old one. Thus, referring to FIG. 9, we begin with an initial configuration. We perturb this and accept only better solutions, i.e., we move downhill only. Therefore, we eventually arrive at point A and cannot go anywhere because uphill moves are not allowed. Thus, we get stuck in a local minimum A even though the global minimum is at point B.

Simulated annealing occurs in the following way. First, a starting point for the minimization is chosen, and labeled as the current point. Next, a new point is picked in the neighborhood of the point. If the new point has a lower function value than the current point, it is automatically adopted as the "current" point for the next step, as in the simple iterative method. If not, then a random number is drawn. That random number determines whether the new point will be adopted as the current point. This gives simulated annealing the ability to jump out of local minimum.

The implementation of simulated annealing involves prescribing three parameters: the probability that a new point will be accepted, the so-called temperature reduction function, and the number of temperature reductions.

They are described as follows:

1. The probability that a new point will be accepted.

If the difference between the new point j and the current point i is less than zero, then the probability of acceptance is 1. If the difference is greater than zero, the probability of acceptance is $$p(\Delta c_{i,j}, T) = \exp\left(\frac{-\Delta c_{i,j}}{T}\right)$$

where $$\Delta c_{i,j} = c(j) - c(i)$$

T is simply a control parameter, which is referred to as the "temperature", in the same units as the cost function.

In the beginning the value of T is relatively large so that many cost-increasing moves are accepted. During the optimization process the temperature is decreased gradually so that fewer and fewer costly moves are accepted.

2. The temperature reduction function.

Kirkpatrick (S. Kirkpatrick, C. D. Gelatt Jr. and M. P. Vecchi, 'Optimization by Simulated Annealing', Science, 220(4598), pp. 671–680, May 1983) proposed a rate of temperature reduction of 0.95. Sechen (C. Sechen, 'VLSI Placement and Global Routing Using Simulated Annealing', Kluwer Academic Publishers, Boston, 1988) pointed out that the system requires fewer state changes at high or low temperatures. However, state change is crucial at a medium temperature. Therefore, the temperature reduction rate can be set at 0.8 at the highest and lowest temperatures, but at 0.95 at a medium temperature.

$$T_n = \alpha(T)T_{n-1} \ (0 < \alpha(T) < 1)$$

where $\alpha(T)$ denotes the temperature reduction rate.

The initial temperature is chosen so as to accept the first ten layouts encountered at the beginning of the calculation.

3. The number of temperature reductions.

The aim is to decrease the temperature to 5% of its initial value. Therefore, the number of temperature reductions can be deduced directly from the temperature reduction function.

Figure 10:
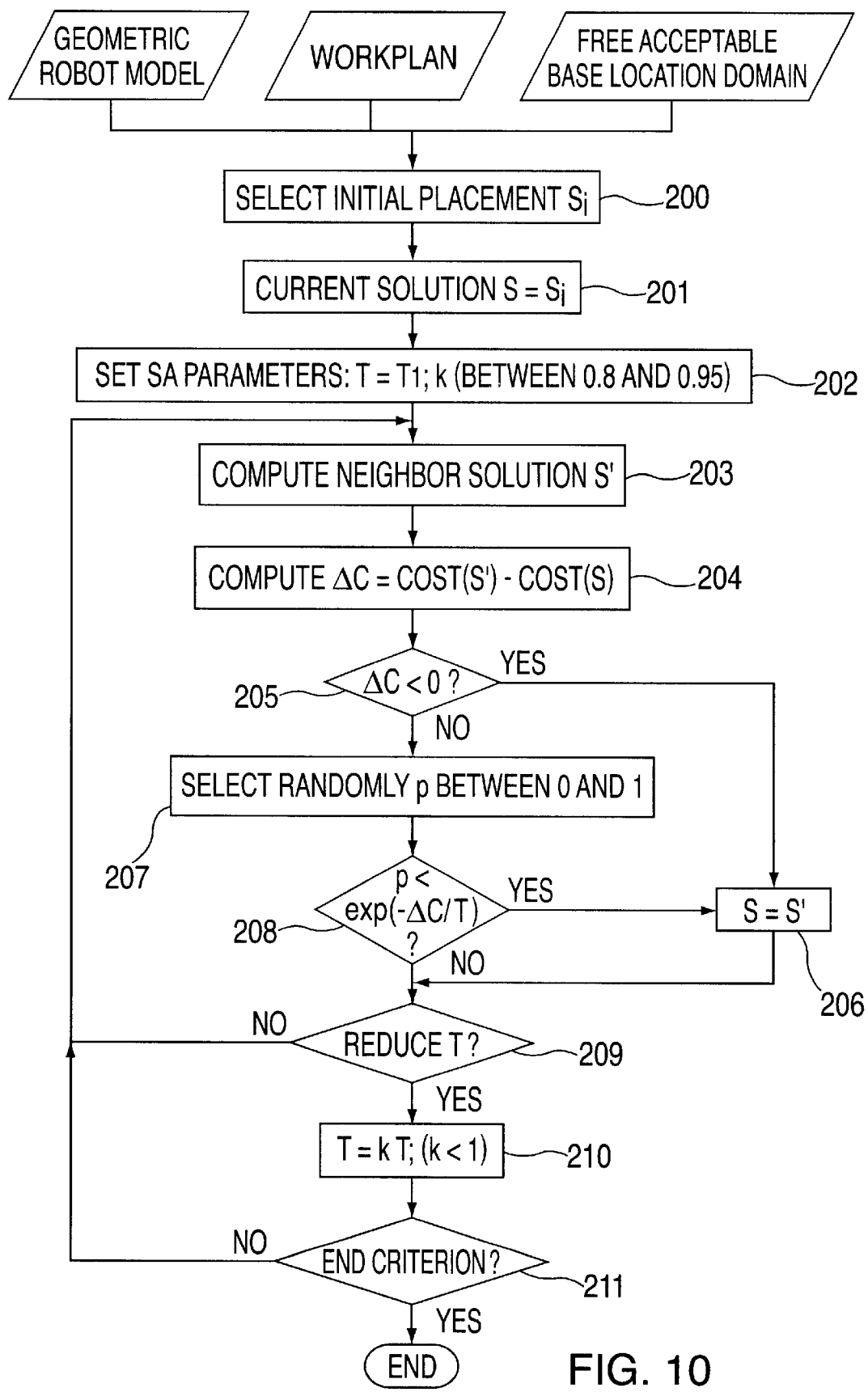
FIG. 10 is a schematic representation of the simulated annealing method.

Simulated annealing as it would be applied to the problem of robot placement is shown by reference to the flow chart in FIG. 10. Initially, the initial placement of the robot is selected, step 200, and is set as the current solution, step 201. In addition, the initial parameters, T and k, are set for the simulated annealing method, 202. The cycle time cost solution for a point neighboring the current point is then calculated, step 203, and it is then compared to the current solution, step 204. In step 205, in the event that the new solution is lower than the current solution, then the value for the current solution is automatically replaced with the value for the new solution, step 206 (yes), and the process is repeated. However, if the new solution is higher then the current solution, step 205(no), then a number between 0 and 1 is randomly selected (step 207) and is then compared to the probability value determined by the probability function described above, as shown in step 208. The generation of the random number, and the probability function described above determine whether the new point will be adopted as the current point, and gives simulated annealing the ability to jump put of a local minimum. If the probability function dictates that the new value be accepted, step 208(yes), then the new point is set as the current point (step 206) despite the fact that it is not as good a solution as the current solution. If on the other hand the new point is rejected, step 208(no), then it is determined whether or not the temperature should be reduced for the next set of iterations (step 209). This is determined by whether or not a predetermined number of neighboring solutions has been evaluated. If not, step 209 (no), the process is repeated using the same temperature value. If a sufficient number of solutions have been evaluated, step 209(yes), then the value for T is reduced in accordance with the temperature reduction function described above, step 210. The entire process is repeated until a minimum value for temperature is achieved, step 211, at which time the process is terminated. The number of neighboring solutions which are evaluated prior to changing temperature is set initially by making an educated guess, and later through knowledge based on experience.

Application of Simulated Annealing

The present invention involves changes and enhancements to the simulated annealing method, so as to improve the method by reducing CPU time. These changes were made for several reasons. Obtaining a single and isolated optimal base location, which is what would be obtained if conventional simulated annealing were employed, is not satisfying in the context of an industrial CAD system. Indeed, the geometric modeling of the robot and its environment do not represent the real world with enough accuracy. If we suppose that the result obtained from the simulated annealing method is surrounded with placements that yield performance debasement, it will be impossible to transfer the results to the real site. Therefore, it would be advantageous to get a domain that contains a solution close to the global optimum and that guarantees a performance loss less than a predefined rate, fixed by the user.

In addition, the simulated annealing method requires long computation times. One reason for the extensive computation is that simulated annealing cannot distinguish a local minimum from an ordinary solution, unless it visits the very bottom of the local minimum. During the initial phase, when the temperature is high, simulated annealing samples a large area of the research space, but only goes deep into the local minima much later, when the temperature has been lowered. This means that, even if the robot's base enters the global minimum's attraction domain early, the simulated annealing method will not perform a local search, but will continue to search the entire domain. This is highly undesirable. It would be advantageous to build some "opportunism" into the conventional simulated annealing method, so that it commits itself to local explorations in the early stages of the search. According to the present invention, a modified simulated annealing algorithm was designed to achieve that purpose, with two new features:

Freeze-heat Cycles.

In order to come up with a solution to the local-exploration problem, two factors are important. The first is that, committing to a local search means in practice performing a gradient descent. The second fact is that simulated annealing is equivalent to a gradient descent when the temperature is close to zero. Thus, in order to add opportunism to the simulated annealing algorithm, it is enough to take the temperature down to nearly zero for as long as it is required to reach the bottom of the local minimum. Afterwards, the temperature can resume its initial decay schedule. This scheme is called the "freeze-heat cycle".

Remembering Local Minima.

Figure 11:
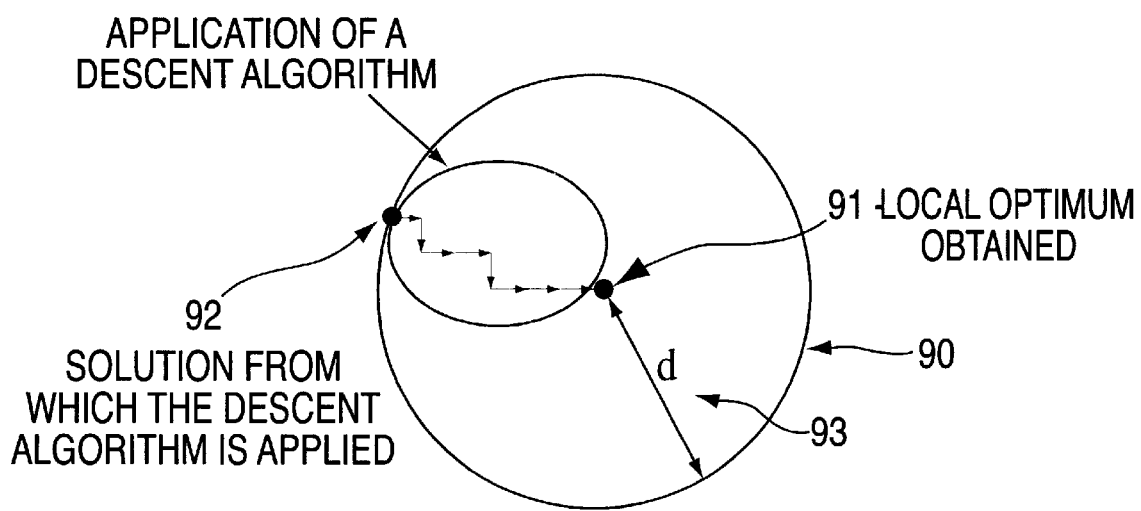
FIG. 11 is a graphic depiction of an "attraction area", according to the present invention.
Figure 12:
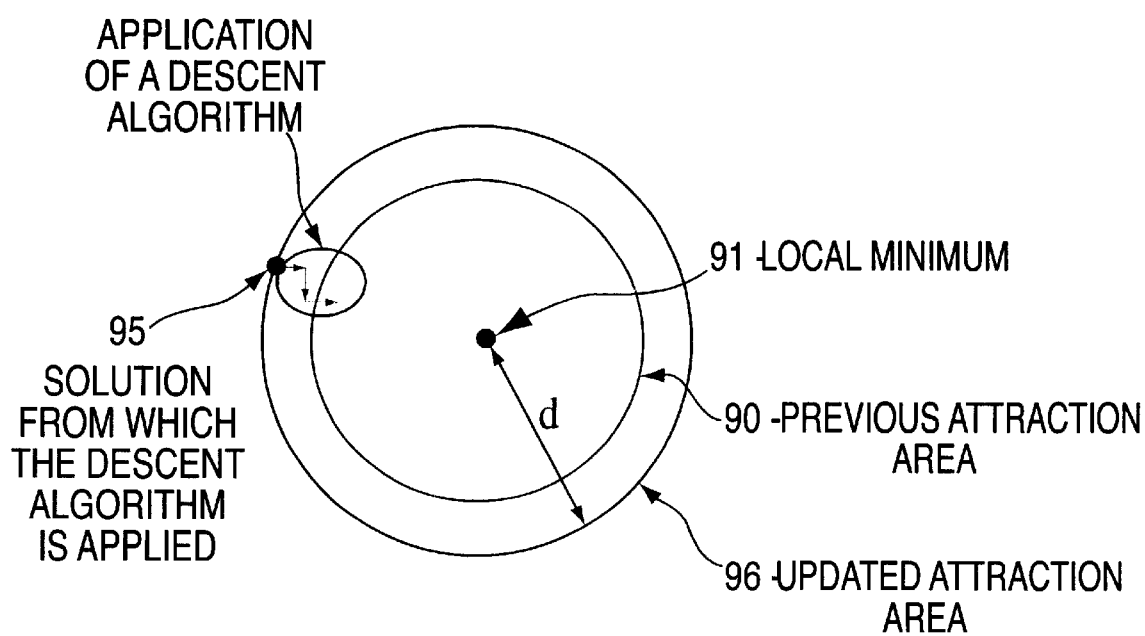
FIG. 12 is a graphic depiction of the expansion of an attraction area, resulting from a gradient descent from an initial data point into an attraction area, according to the present invention.

Ideally it would be advantageous to explore a minimum valley as fast as possible (freezing), escape from it as fast as possible (heating), and never visit it again. In order to avoid revisiting the same local minima, according to present invention, a list of all the local minima found so far is stored, together with an estimate of their attraction areas. For this purpose, the attraction area of a local minimum is defined as the set of all the base locations from which a gradient descent is supposed to terminate at this local minimum. Practically such sets are impossible to describe analytically and an attraction area will correspond to a circle centered on the local minimum, which passes via the initial base location of the gradient descent. This is shown graphically in FIG. 11, wherein the area within the circle 90 is the attraction area. The diameter d (93) is established by the distance from the local minimum 91 to the solution, or location 92, from which the descent algorithm was applied which resulted in finding the local minimum 91. As shown in FIG. 12, any time later during the search that gradient descent from another location 95, which is outside an attraction area 90, terminates in a configuration which is inside 90, the size of attraction area 90 is updated to include the location 95, resulting in an expanded attraction area bounded by the circle 96. Such attraction areas may overestimate the size of a real local minimum attraction area. However, the modified method is formulated so that this does not affect the convergence properties of the simulated annealing method, while giving better results. Gradient descent will indeed be initiated only from configurations which are outside any existing attraction area; while a configuration is within an attraction area, simulated annealing will keep performing random steps, yielding possibly a new minimum.

Figure 13:
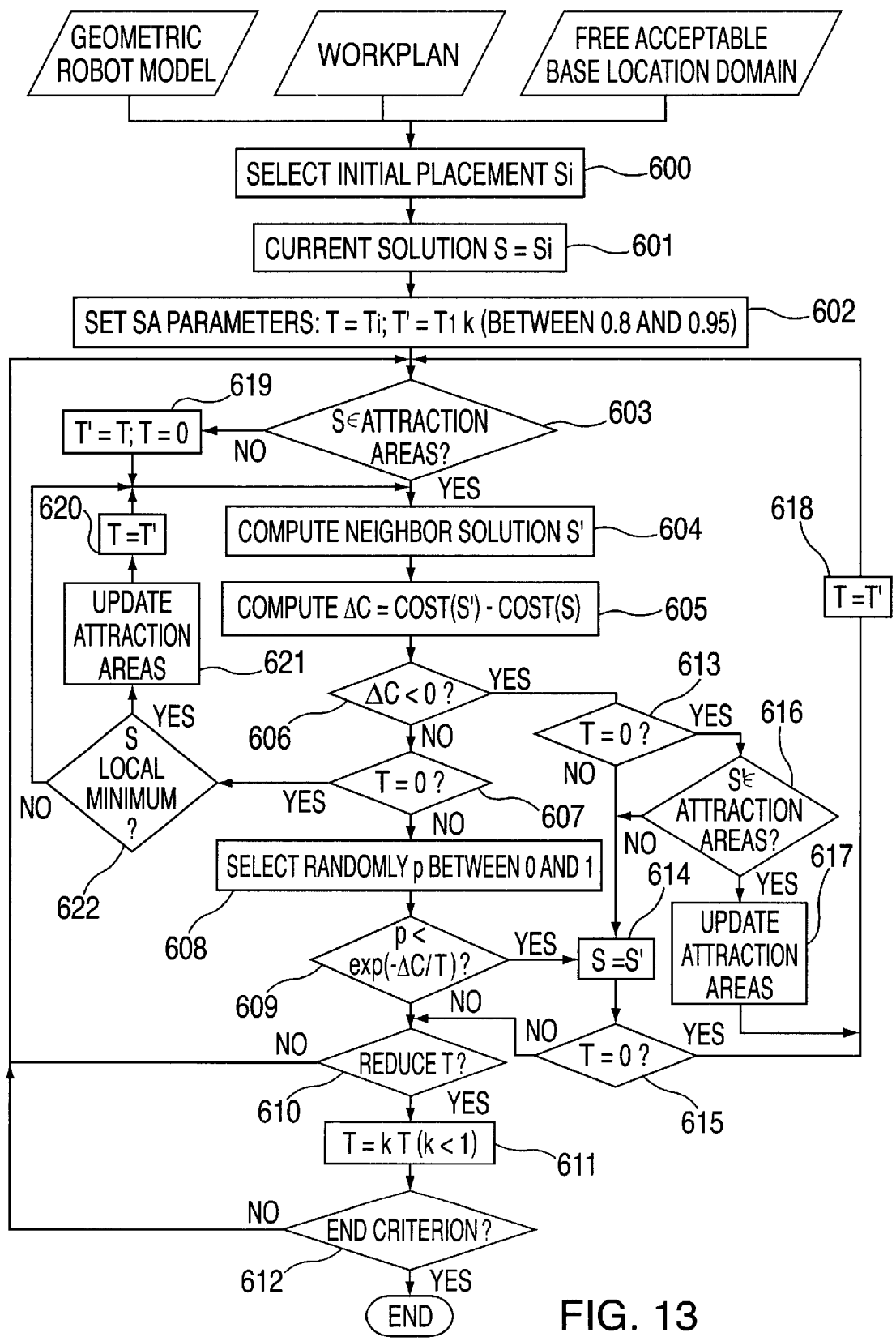
FIG. 13 is a schematic representation of the modified simulated annealing method, according to the present invention.

Referring to FIG. 13, the method of the modified simulated annealing algorithm of the present innovation is depicted. Thus, an initial robot location is selected from the free acceptable base location domain (step 600), that location is set as the current solution (step 601), and the temperature function is initialized (step 602). It is then determined whether the current solution is within an attraction area (step 603). If so, then standard simulated annealing is applied to find the global optimum within the area. Referring to FIG. 13, this would involve steps 604 to 615, where the answer to the query "T=0" called for in steps 607, 613, and 615 is answered in the negative. In this case the temperature is reduced in accordance with the temperature reduction function.

If, however, the current solution is not within an attraction area, then the freeze-heat cycle is applied by setting the value for T to zero (step 619), resulting in a descent algorithm which works quickly towards a minimum without the possibility of jumping out of a local minimum, or going "uphill". In the event that the solution being evaluated is not in an attraction area, then one of two results occur. If, during the descent algorithm, the solution descends into the area of an existing attraction area, then the existing attraction area is updated so as to include the solution from which the descent algorithm originated, in which case the size of that attraction area is increased, as shown in FIG. 12. This is shown in FIG. 13 in step 616. In that step a solution that is better than the initial solution, as determined in step 606, arrives at step 616, since the query in step 613 is answered in the affirmative (T=0). At step 616 it is determined that the new solution is within an existing attraction area, and the attraction area is then updated to include the solution from which the descent originated, resulting in an expanded attraction area.

On the other hand if, during the descent algorithm, the solution descends to a minimum without having fallen into an existing attraction area, then it is determined that a local minimum has been found at the center of a new attraction area. In this case the corresponding attraction area is created and stored (FIG. 13, steps 621 and 622).

EXAMPLE

An example of the application of the method of the invention is now described with respect to a workplan defined by bringing a welding tool to various positions of a car windscreen, as shown in FIG. 5. The workplan was composed of six points (1 to 6) with fixed position and orientation, while the individual moves consist in segments in the Cartesian space.

The workplan was designed so as to avoid collisions with the car body, whatever base placement is chosen. In this way, the example focused on the modified simulated annealing method's performance, as the acceptable base location domain is as large as possible for the workplan under consideration.

Figure 14:
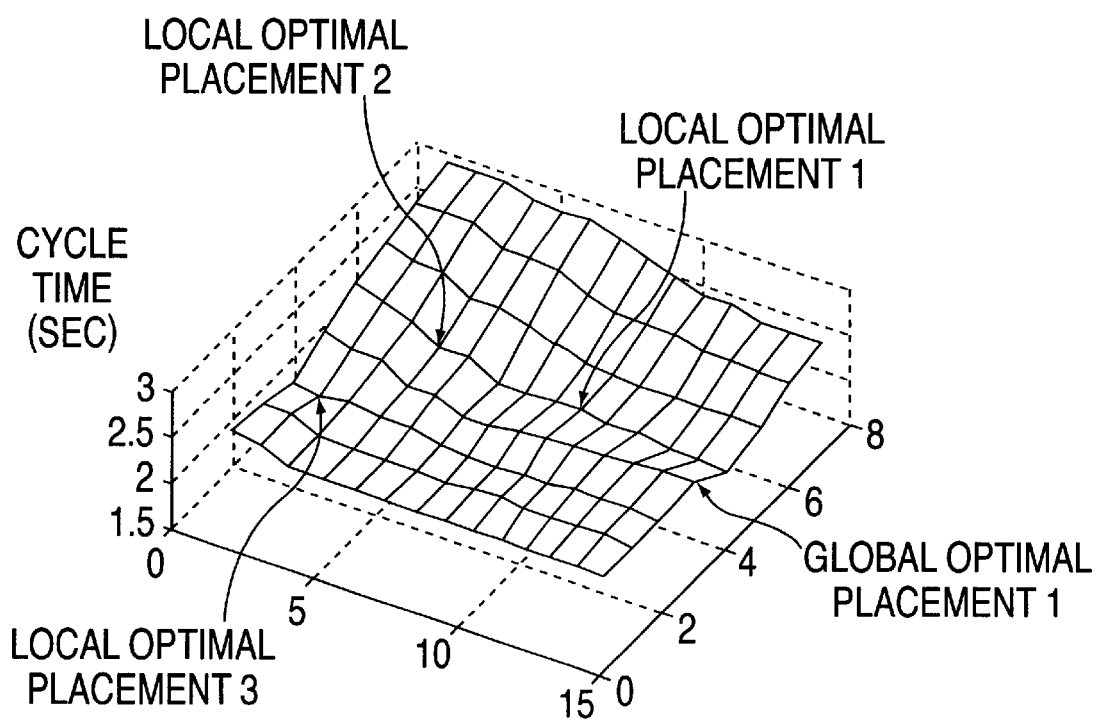
FIG. 14 provides a graphic illustration in landscape form of a set of near optimum data points generated by the simulated annealing method of the present invention.

The modifications of the simulated annealing method yield a set of local optima, resulting from the gradient descents at the beginning of the calculation. FIG. 14 shows graphically their locations in the neighborhood of the global optimal placement. These placements may be advantageous in the event that additional constraints, not considered initially, are added to the workplace, rendering some of the base locations impractical. The ability of the modified simulated annealing method of the present invention to obtain a set of near optimum points is a great advantage over the conventional simulated annealing method, which produces only one optimum point. Practically speaking, the workplace environment is subject to frequent changes. When such changes occur, rendering one or more base locations inoperable, the user may quickly select another location from the set of near-optimal locations found with the modified simulated annealing method. Thus, a new placement location is available immediately, without the necessity of performing an entirely new simulation, with the new constraints, to find a good robot base location.

Figure 15:
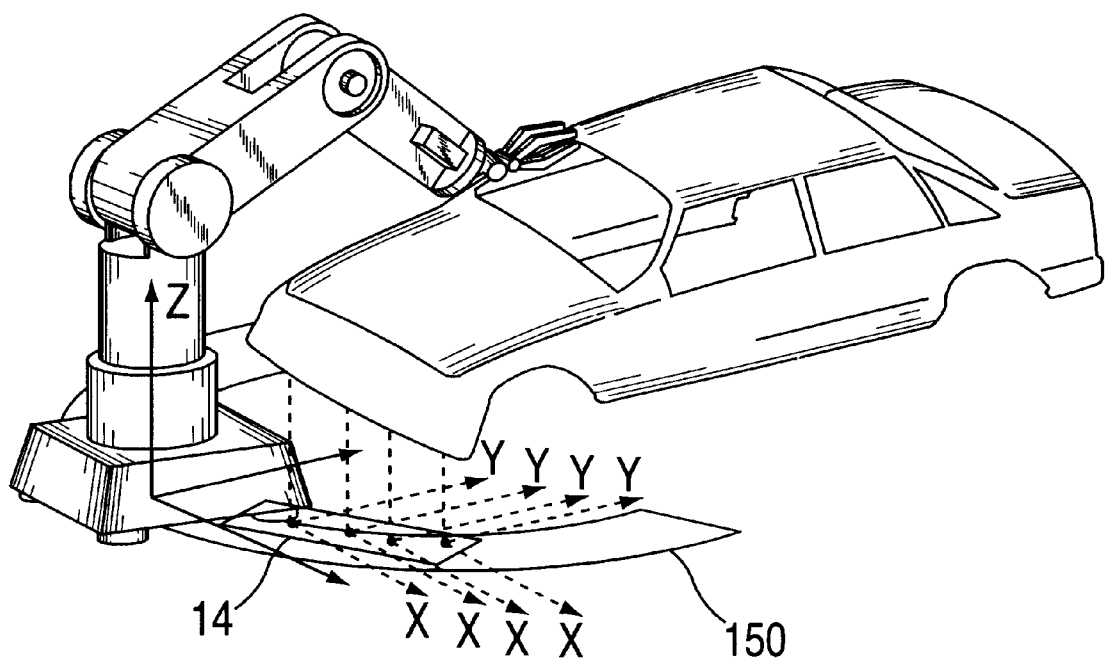
FIG. 15 depicts the field of data points of FIG. 14 superimposed on the free acceptable base location domain.

The optimal position of the robot's base found in the example resulted in a cycle time of 1.84 seconds, which is an improvement by 38 percent compared to the location with the worst performance. In FIG. 15, the optimal placements depicted in FIG. 14 (14) are shown placed within the base location domain 150. The optimal position is relatively close to the contour of the base location domain 150. Nevertheless, the region that guarantees a performance loss less than 10 percent is comparatively large (FIG. 14). The computation time for such a result was 5 minutes, 95 percent of it being required by the objective function evaluations with CAD software.

It is to be understood that the foregoing method can be applied to robot placement for any workplace configuration capable of being defined by the CAD/CAM system. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. It will be understood that various modifications may be made without departing from the spirit and scope of the invention. Therefore, other implementations are within the scope of the following claims.

What is claimed is:

1. A CAD/CAM computer system comprising:

an input device;

a central processing unit; and a memory device for storing data;

wherein the central processing unit runs an application program comprising code for determining a discrete set of locations within a workcell for the placement of a robot, said discrete set of locations being locations that would allow the robot to complete a given workplan in less time than if the robot were placed elsewhere in the workcell and without hitting obstacles in the workcell, said code comprising means for:

a) determining an acceptable base location domain defining an area in which the robot base may be placed so that an end-effector of the robot may reach all work points in the workplan, said acceptable base location domain being determined by:

i) performing a simulation wherein the end-effector of the robot is fixed to a work point;

ii) selecting a discrete set of positions of a wrist joint of the robot while the end-effector is fixedly attached to the work point;

iii) for each discrete wrist position, sweeping a primary arm of the robot through its range of motion while recording the area in which the robot base travels;

iv) performing steps i) to iii) for each work point; and v) choosing as the acceptable base location domain the area which is common to all of the areas recorded in step iv);

b) determining obstacle shadows defining regions of robot base placement within the acceptable base location domain which would result in collisions between the robot and objects in the workcell;

c) determining a free acceptable base location domain by subtracting the obstacle shadows from the acceptable base location domain; and d) searching said free acceptable base location domain for said discrete set of locations using a modified simulated annealing technique, said modifications comprising:

i) storing local minima as they are encountered during the simulated annealing process;

ii) storing attraction areas corresponding to each of said local minima, comprising areas surrounding a local minimum data point;

iii) performing a gradient descent, by setting a temperature function of the simulated annealing method to a value of zero, when a data point from the free acceptable base location domain is encountered that is not within an attraction area; and iv) redefining and storing an attraction area when a gradient descent generates data points falling within an attraction area so that the attraction area includes the data point from which the gradient descent began.

2. The CAD/CAM computer system of claim 1 wherein an obstacle shadow for an obstacle in the workcell is determined by a method comprising:

a) calculating a visibility sector for the obstacle for each work point, wherein the end-effector is fixed to a work point;

b) defining a global path as the bisecting line of the visibility sector;

c) defining an initial point as the intersection of the global path and the exterior contour of the acceptable base location domain;

d) defining a goal point as the intersection of the global path and the interior contour of the acceptable base location domain;

e) moving the base of the robot from the initial point along the global path until a collision is detected;

f) defining a new initial position by moving the robot base in a first direction along the exterior contour of the acceptable base location domain;

g) moving the base of the robot along a path from the new initial point to the goal point until a collision is detected;

h) repeating steps f) and g) until the base can be moved to the goal point without collision;

i) moving the base back to the initial position;

j) defining a new initial position by moving the robot base in a second direction along the exterior contour of the acceptable base location domain;

k) moving the base of the robot along a path from the new initial point to the goal point until a collision is detected;

l) repeating steps j) and k) until the base can be moved to the goal point without collision;

m) repeating steps e) through l), with the initial point defined as the previous goal point, and the goal point defined as the previous initial point.

3. Computer executable code stored on a computer readable medium, the code comprising means for causing a CAD/CAM computer system to determine a discrete set of locations within a workcell for placement of a robot, said discrete set of locations being locations that would allow the robot to complete a given workplan in less time than if the robot were placed elsewhere in the workcell, and would allow the robot to complete the workplan without hitting obstacles in the workcell, said code further comprising means for causing the computer system to execute the method comprising:

a) determining an acceptable base location domain defining an area in which the robot base may be placed so that an end-effector of the robot may reach all work points in the workplan, said acceptable base location domain being determined by:

i) performing a simulation wherein the end-effector of the robot is fixed to a work point;

ii) selecting a discrete set of positions of a wrist joint of the robot while the end-effector is fixedly attached to the work point;

iii) for each discrete wrist position, sweeping a primary arm of the robot through its range of motion while recording the area in which the robot base travels;

iv) performing steps i) to iii) for each work point; and v) choosing as the acceptable base location domain the area which is common to all of the areas recorded in step iv);

b) determining obstacle shadows defining regions of robot base placement within the acceptable base location domain which would result in collisions between the robot and objects in the workcell;

c) determining a free acceptable base location domain by subtracting the obstacle shadows from the acceptable base location domain; and d) searching said free acceptable base location domain for said discrete set of locations using a modified simulated annealing technique, said modifications comprising:

i) storing local minima as they are encountered during the simulated annealing process;

ii) storing attraction areas corresponding to each of said local minima, comprising areas surrounding a local minimum data point;

iii) performing a gradient descent, by setting a temperature function of the simulated annealing method to a value of zero, when a data point from the free acceptable base location domain is encountered that is not within an attraction area; and iv) redefining and storing an attraction area when a gradient descent generates data points falling within an attraction area so that the attraction area includes the data point from which the gradient descent began.

4. The computer executable code stored on a computer readable medium of claim 1, said code further comprising means for causing the computer system to execute a method for determining an obstacle shadow comprising:

a) calculating a visibility sector for the obstacle for each work point, wherein the end-effector is fixed to a work point;

b) defining a global path as the bisecting line of the visibility sector;

c) defining an initial point as the intersection of the global path and the exterior contour of the acceptable base location domain;

d) defining a goal point as the intersection of the global path and the interior contour of the acceptable base location domain;

e) moving the base of the robot from the initial point along the global path until a collision is detected;

f) defining a new initial position by moving the robot base in a first direction along the exterior contour of the acceptable base location domain;

g) moving the base of the robot along a path from the new initial point to the goal point until a collision is detected;

h) repeating steps f) and g) until the base can be moved to the goal point without collision;

i) moving the base back to the initial position;

j) defining a new initial position by moving the robot base in a second direction along the exterior contour of the acceptable base location domain;

k) moving the base of the robot along a path from the new initial point to the goal point until a collision is detected;

l) repeating steps j) and k) until the base can be moved to the goal point without collision;

m) repeating steps e) through l), with the initial point defined as the previous goal point, and the goal point defined as the previous initial point.

* * * * *